United States Patent
Avvari et al.

(10) Patent No.: US 7,165,074 B2
(45) Date of Patent: Jan. 16, 2007

(54) SOFTWARE DEVELOPMENT TEST CASE ANALYZER AND OPTIMIZER

(75) Inventors: Madhava V. Avvari, Cupertino, CA (US); Philip A. Chin, San Jose, CA (US); Murali K. Nandigama, San Jose, CA (US); Uday S. Dhanikonda, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 491 days.

(21) Appl. No.: 10/142,226

(22) Filed: May 8, 2002

(65) Prior Publication Data

US 2003/0212924 A1 Nov. 13, 2003

(51) Int. Cl.
*G06F 17/30* (2006.01)

(52) U.S. Cl. ............... 707/102; 707/10; 707/203; 714/38

(58) Field of Classification Search ............ 707/1–10, 707/100–104.1, 200–205; 717/115, 118; 715/716; 714/34, 38
See application file for complete search history.

(56) References Cited

U.S. PATENT DOCUMENTS 5,673,387 A * 9/1997 Chen et al. ............... 714/38
6,314,558 B1 * 11/2001 Angel et al. ............. 717/118
6,701,514 B1 * 3/2004 Haswell et al. .......... 717/115
6,850,252 B1 * 2/2005 Hoffberg .................. 715/716
2003/0093716 A1 * 5/2003 Farchi et al. ............. 714/34

OTHER PUBLICATIONS

U.S. Appl. No. 10/143,620, filed on May 8, 2002, entitled "Software Development Test Case Maintenance".

* cited by examiner

*Primary Examiner*—Mohammad Ali
(74) *Attorney, Agent, or Firm*—Martine Penilla & Gencarella, LLP

(57) ABSTRACT

An intelligent test system for testing software code is provided. The intelligent system includes a profiled software component, a test executor, a database, a database updater, and a data analyzer/optimizer. The test executor creates a coverage data by using the profiled software component to execute a plurality of test cases of a test suite. The database stores the coverage data and the database updater is configured to store the coverage data into the database. The data analyzer/optimizer analyzes the coverage data contained in the database to find test cases affected by a modification to the software code. The data analyzer/optimizer also optimizes the test cases affected by the modification by selecting fewer test cases that satisfy a criteria. The test executor uses the test cases that satisfy the criteria to test the modification to the software code.

16 Claims, 15 Drawing Sheets

| Method Name | Class Name | Testcase name | Component | Coverage |
|---|---|---|---|---|
| Interrupt() | Thread | Thread1.java | NET | 80% |
| Interrupt() | Thread | Thr001.java | VM | 95% |
| Interrupt() | Thread | 2DTest1.java | 2D | 75% |
| Interrupt() | Thread | JSPThr1.java | JSP | 82% |
| Interrupt() | Thread | Thr002.java | VM | 15% |

FIG. 6A

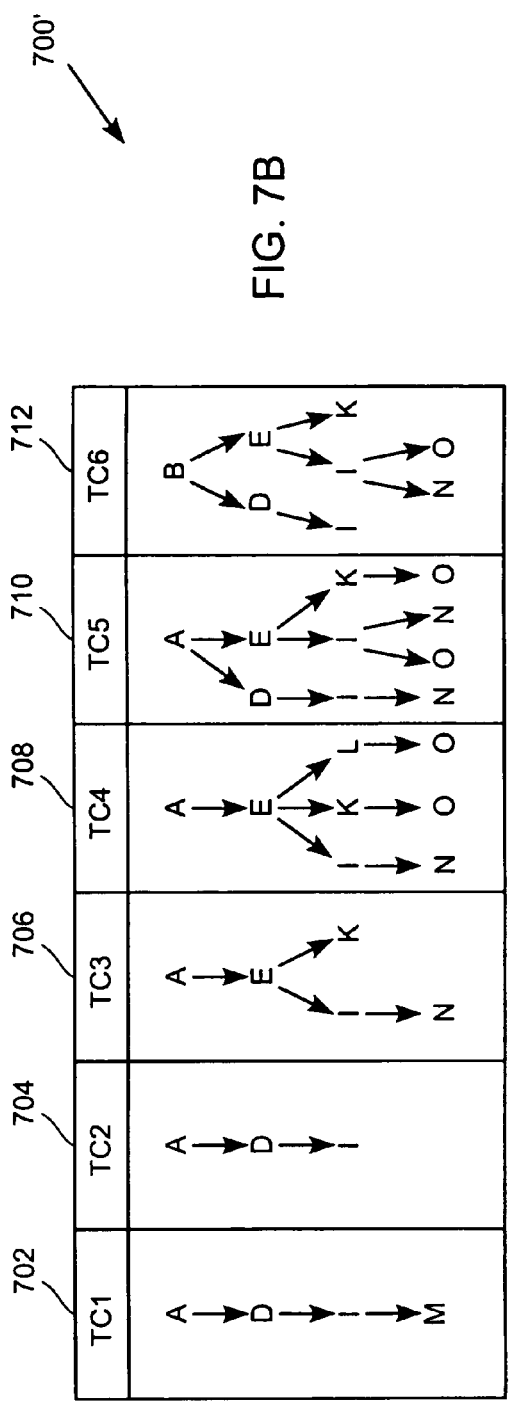

SOFTWARE DEVELOPMENT TEST CASE ANALYZER AND OPTIMIZER

CROSS REFERENCE TO RELATED APPLICATIONS

This application is related to U.S. patent application Ser. No. 10/143,620, filed on May 8, 2002, and entitled "Software Development Test Case Maintenance."

BACKGROUND OF THE INVENTION

1. Field of the Invention

The present invention relates generally to software testing, and more particularly, to methods and systems for testing computer software intelligently.

2. Description of the Related Art

As the use of computer software in performing daily tasks is increasing rapidly, assessing software reliability through software testing has become an imperative stage in the software development cycle. As is well known, software testing is directed toward eliminating defects (i.e., bugs) in computer software, which if undetected, can create significant negative results.

As is well known, multiple groups of developers are involved during the computer software development, each group responsible for developing a certain portion of the source code (i.e., a workspace). Each group ensures that its workspace performs properly before integrating it into the master workspace. That is, each group is responsible for ensuring the proper performance of its workspace every time a modification is made to the source code. Typically, testing the integrity and proper performance of the modified workspace is performed using a pre-integration testing using multiple test cases of a given test suite. Once it has been established that the modified workspace functions properly, the modified workspace is then included in the baseline (i.e., the master workspace) which integrity is then tested using the nightly testing.

Typically, to achieve a bug-free workspace, the group is responsible for manually setting up and executing the test system. That is, the group is responsible for manually selecting the essential test cases to be executed and manually distributing the test cases to different computer systems.

As is well known, the number of test cases in each test suite is typically static (i.e., fixed) and in the order of thousands for any given source code. Thus, for ease of reference, all the test cases of a give test suite are equally divided and defined in multiple components. For instance, a test suite may include ten (10) components, with each component including an equal number of test cases (e.g., about 5,000 test cases).

Desirably, testing the modified should involve the execution of test cases affected by such modifications. However, selecting only the affected test cases requires that the members of the group be able to determine which test cases are affected, which in turn, requires the members of the group to have intimate knowledge of each test case in each component of each test suite. Since most members of the group do not have the necessary information, thus far, the testing process involves the execution of all test cases in selected components or all the components. As a result, typical testing process involves executing more than the necessary number of test cases. For instance, when a given component includes five thousand (5000) test cases, all 5000 tests cases in the component are executed when only thirty (30) test cases should be executed. Thus, the testing process suffers from executing a static number of test cases in the components irrespective of the fact that the necessary number of test cases may be significantly less.

Furthermore, using all the test cases in each and every component further suffers from redundancy resulting in a waste of time and resources. This occurs since multiple test cases may test the same functions or methods of the source code. Additionally, performing certain number of test cases unnecessarily causes the testing cycle to stretch for an extended period of time.

In certain scenarios, the modification to one workspace can further affect workspaces of different groups. However, since most groups are not familiar with the workspaces of the others, selecting a proper test case or component out of multiple test cases and components is an impossible task. As a result, a number of groups execute an unnecessary number of test cases. Thus, computer resources are unnecessarily wasted while significantly increasing the number of hours merely dedicated to analysis of the results produced by the testing process. Although one way to avoid this problem is having extended interactions between different groups, such interactions are disfavored, as they involve numerous time-consuming communication cycles.

In view of the foregoing, there is a need for a flexible methodology and system to intelligently test computer software.

SUMMARY OF THE INVENTION

Broadly speaking, the present invention fills these needs by testing computer software intelligently through optimizing the computer software testing process and minimizing redundancy and manual intervention. In one embodiment, an intelligent software test system tests a modified computer source code using a dynamic precision test list of test cases affected by a modification to the source code. It should be appreciated that the present invention can be implemented in numerous ways, including as a process, an apparatus, a system, a device, or a method. Several inventive embodiments of the present invention are described below.

In one embodiment, an intelligent test system for testing software code is provided. The intelligent system includes a profiled software component, a test executor, a database, a database updater, and a data analyzer/optimizer. The test executor creates a coverage data by using the profiled software component to execute a plurality of test cases of a test suite. The database is configured to store the coverage data and the database updater is configured to store the coverage data into the database. The data analyzer/optimizer is configured to analyze the coverage data contained in the database to find test cases affected by a modification to the software code. The data analyzer/optimizer is also configured to optimize the test cases affected by the modification by selecting fewer test cases that satisfy a criteria. The test executor uses the test cases that satisfy the criteria to test the modification to the software code.

In another embodiment, a data collection module of a test system is provided. The data collection module includes a test suites component, a profiled software component, a test executor, a database, and a database updater. The test suites component has a test suite that includes a plurality of test cases. The test executor is configured to use the profiled software component to process the test cases in the test suite so as to create coverage data. The database is configured to store the coverage data and the database updater is configured to store the coverage data into the database. The coverage data stored in the database is used to eliminate redundant test cases.

In yet another embodiment, a data processing module for use in a test system is provided. The data processing module includes a database component, a source code controller system, a data analyzer/optimizer, and a test executor. The database is configured to store coverage data. The source code controller system is configured to provide modified information. The modified information defines a modification to source code. The data analyzer/optimizer is configured to analyze the coverage data using the modified information to find test cases affected by the modified information. The data analyzer/optimizer is further configured to create a precision test list that includes the test cases, which satisfy a criteria. The test executor is configured to use the test cases that satisfy the criteria to test the modification to the source code.

In still another embodiment, a method for testing computer software under development is provided. The method includes using instrumented code to execute test cases in a test suite so as to create coverage data. The method also includes storing the coverage data in a database and obtaining modification information to the source code of the computer software under development. Also included in the method is analyzing the coverage data in the database so as to find test cases affected by a particular modification to the source code. Additionally, the method includes creating a dependency test list of all test cases affected by the particular modification to the source code. Further included in the method is optimizing the test cases in the dependency test list by selecting the test cases that satisfy a criteria and executing the source code using selected test cases satisfying the criteria.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 6A depicts a portion of an exemplary table storing the coverage data in the database, in accordance with yet another embodiment of the present invention.

FIG. 7B depicts an analyzed test list containing a plurality of test cases affected by a modification to the source code, in accordance to still another embodiment of the present invention.

FIG. 7C is a precision test list of the analyzed test list shown in FIG. 7B, in accordance to still another embodiment of the present invention.

DETAILED DESCRIPTION OF THE PREFERRED EMBODIMENT

Figure 1:
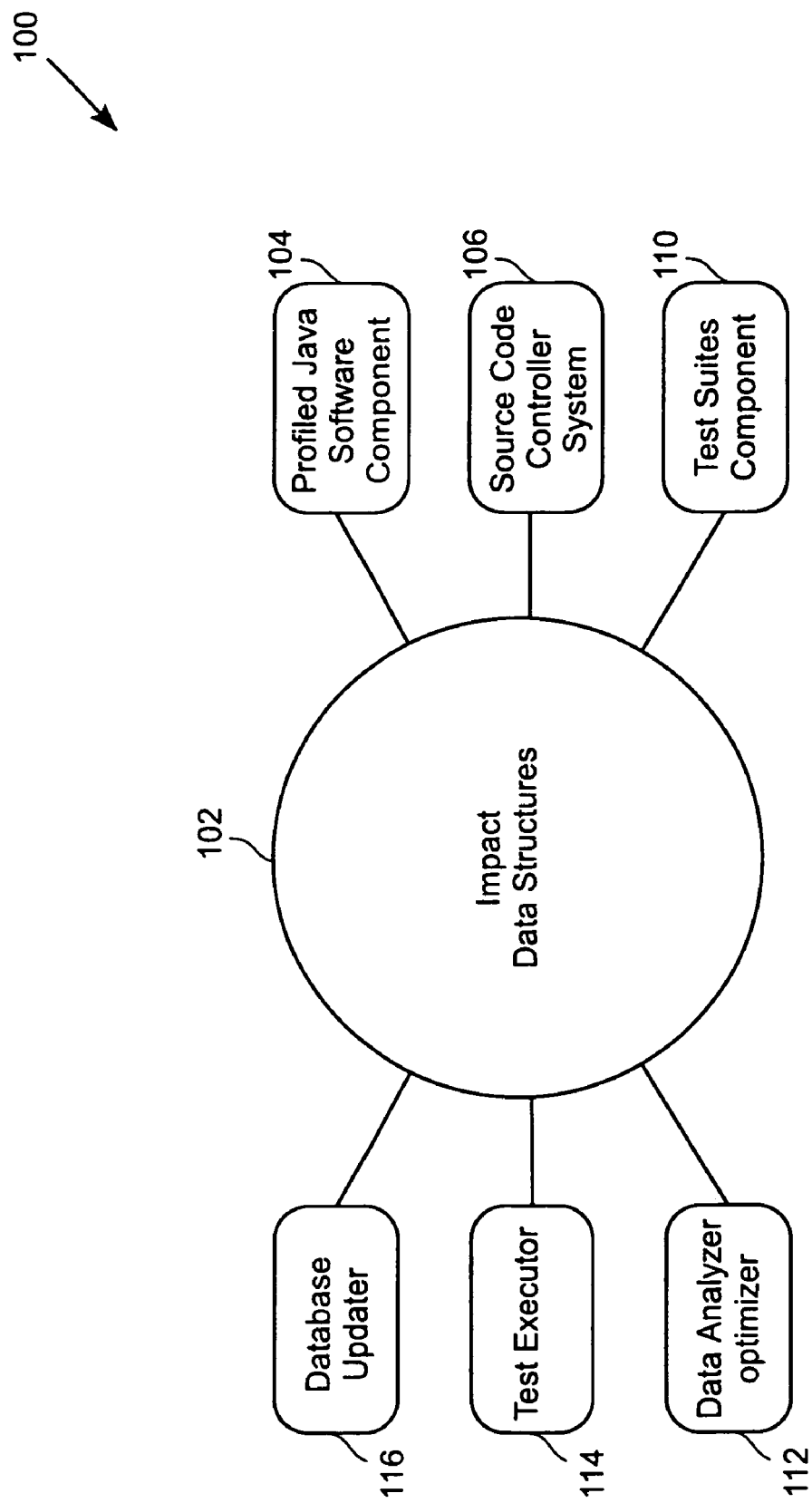
FIG. 1 is a simplified schematic diagram of an exemplary intelligent software test system, in accordance with one embodiment of the present invention.

Inventions for intelligent testing of computer software by optimizing the computer software testing process and minimizing redundancy and manual intervention are provided. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

The intelligent test system of the present invention is a knowledge-based system, which collects, corrects, improves, and heals on its own. By way of example, the intelligent test system of the present invention uses instrumented software, herein also referred to as profiled software, to execute all test cases in all of the test suites so as to create coverage data. The coverage data is then saved into a database using an updater interface.

In one instance, a source code controller system provides the data analyzer with a list of all modifications to the source code. The data analyzer then uses the modifications to the source code to search the database so as to locate the call trees affected by the modifications. In one example, the data analyzer creates an analyzed list of all test cases affected by the modification (i.e., a dependency test list). The dependency test list is then analyzed by the data optimizer so as to determine whether any of the test cases satisfy a certain criteria. The data optimizer then creates a precision test list of all the selected test cases satisfying the criteria. The test cases in the precision test list are then used by a test executor to test the modified source code.

In one instance, the intelligent test system is self-healing. That is, the intelligent test system is updated automatically, in accordance with a scheduled interval. By way of example, coverage data saved into the database is maintained updated by executing the updated test cases in the updated test suites using the updated instrumented software. In one embodiment, each updated call tree in the updated coverage data is compared with a corresponding existing call tree. If there have been any modifications to a path of the updated call tree, the updated call tree replaces the existing call tree. However, if there have been no modifications to the existing call tree, no replacement is required. In another embodiment, the data coverage data stored into the database is flushed out and replaced by the updated coverage data.

As one embodiment of the present invention implements the Java™ (hereinafter "Java") programming language, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and Intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Keeping this brief overview to Java in mind, reference is now made to FIG. 1 illustrating an exemplary intelligent software test system 100, in accordance with one embodiment of the present invention. The intelligent software test system includes a database 102, a profiled Java software component 104, a source code controller system 106, a test suites component 110, a data analyzer/optimizer 112, a test executor 114, and a database updater 116.

In accordance with one embodiment, the test executor 114 uses all test cases in all of the test suites defined in the test suites component 110 using a profiled Java software component 104 creating coverage data. In one example, the profiled Java software 104 is the Java binary profile. The coverage data resulting from executing all the test cases using the profiled Java software component may be represented in different formats (e.g., branch profile format herein also referred to as call tree format, etc.). Additional details about different formats implemented to represent the profiled data is provided below with respect to FIG. 2.

As will be discussed in more detail below, the call tree coverage data reveals all significant dependencies on the modified functions/methods, even if the dependent functions/methods belong to different test cases in different components of the test suite. The coverage data is then sent to the database updater 116, which in one example, is an interface to the database 102. As the interface, the database updater can be configured to execute any appropriate test harness. The coverage data is then stored in the database 102.

In one example, the source code controller 106 is configured to provide the data analyzer/optimizer 112 with a list of all the modifications to the source code. The data analyzer/optimizer 112, acting in the capacity of the analyzer, analyzes each test case stored into the database 102 so as to locate all test cases affected by the modifications to the source code. In one embodiment, the data analyzer creates a dependency test list of all the test cases affected by the modification to the source code. Thereafter, the data analyzer/optimizer 112, acting in the capacity of an optimizer, attempts to optimize the dependency test list by determining whether any of the test cases in the dependency test list satisfy a criteria. In one example, the data analyzer/optimizer 112 creates a precision test list of test cases satisfying a specific criteria. In one instance, the data analyzer/optimizer may create the precision test list wherein redundant test cases have been eliminated. In one instance, redundancy of the test cases is ascertained by determining whether more than one test case traverses the same path or whether a path traversed by a first test case is inclusive of the path traversed by a second test case. In such scenario, the test case which path encompasses the other is placed in the precision test, irrespective of the fact that each test case is in a different components. In a different example, the test case covering the greatest portion of the source code of the modified function/method is selected, thus eliminating test cases having less coverage.

Upon determining the optimized test cases and creating the precision test list, a product Java source code executable is tested using only the test cases in the precision test list, eliminating the redundancy shortcoming associated with the prior art.

In one example, the intelligent test system 100 of the present invention is self-healing. That is, the intelligent test system of the present invention is maintained using a systematic updating process. In one embodiment, the intelligent test system is updated at a pre-set schedule. Additional information about the self-healing characteristic of the present invention are provided below with respect to FIGS. 5A and 5B. Thus, in performing a continuous self-healing process, the intelligent test system locates the modifications, deletions, or additions of any new paths to any of the existing test cases or newly created test cases, thus providing an updated database.

Figure 2:
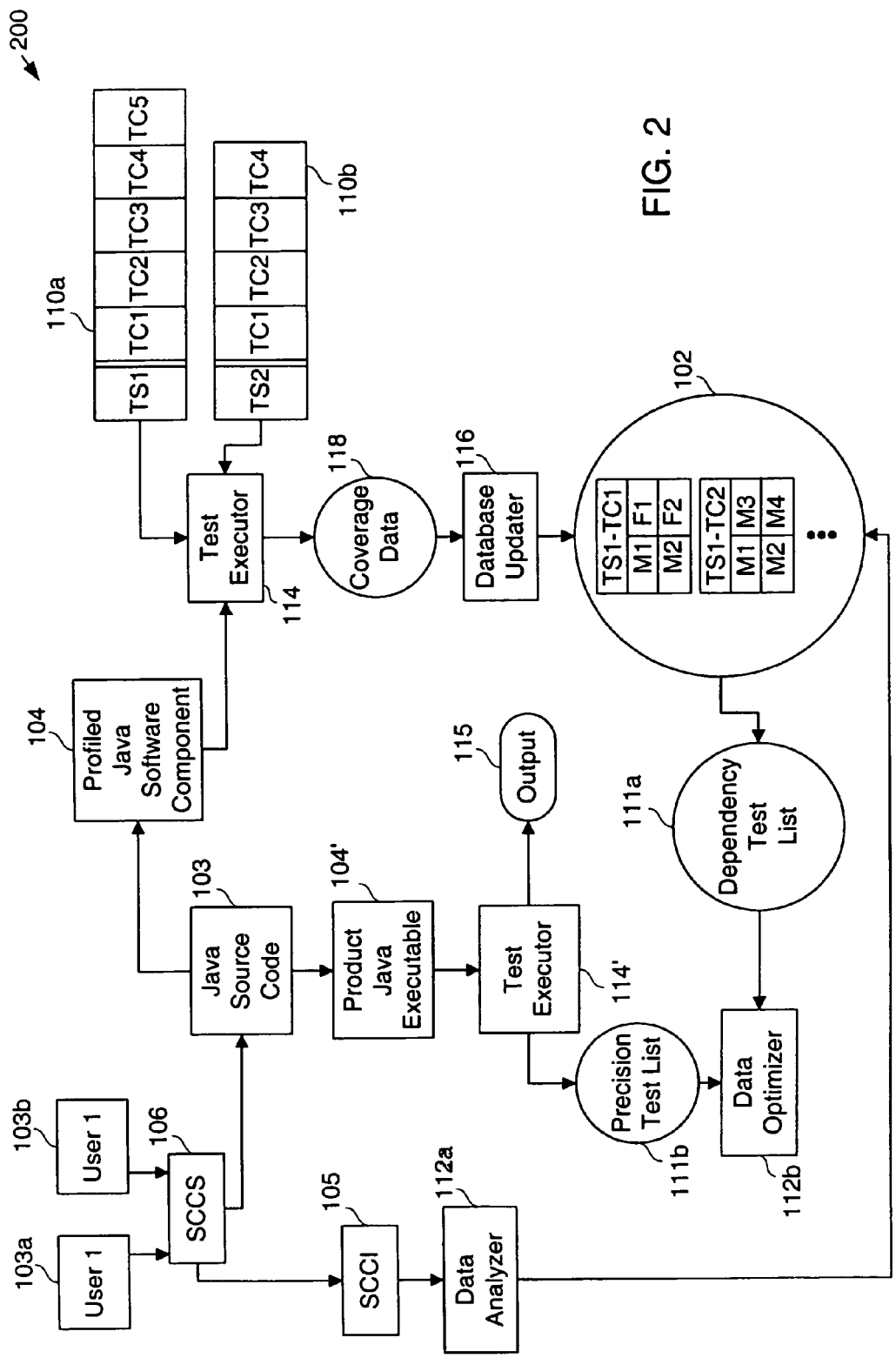
FIG. 2 is a simplified block diagram of the intelligent software test system, in accordance with another embodiment of the present invention.

In accordance with one embodiment of the present invention, FIG. 2 illustrates testing of the modified source code using only the test cases affected by the modifications to the source code. As shown, the source code controller system 106 is configured to provide a Java source code 103 to the intelligent test system 200. In one example, the Java source code 103 is a collection of all files.

In one instance, the test executor 114 uses the profiled Java software component 104 (i.e., profiled Java executable) of the Java source code 103 to run test cases TC1–TC5 of a test suite 110a and test cases TC1–TC4 of a test suite 110b so as to create the coverage data 118. The coverage data 118 is raw profiled coverage data, which in one embodiment has the format of a call tree. The coverage data is saved into the database 102 using an interface database updater 116. As shown, a plurality of exemplary data structures 102a and 102b are shown to include the coverage data 118 for the TC1 and TC2 of the test suite 110a. In one instance, the data structures 102a and 102 are configured to be tables. As shown, the table 102a includes methods M1 and M2 and functions F1 and F2 while the table 102b includes methods M1–M4.

As also illustrated in the embodiment of FIG. 2, all modifications to the Java source code 103 by a pair of users 103a and 103b are automatically communicated to the data analyzer 112a using a source code analyzer interface 105. The data analyzer 112a then analyzes the database 102 by searching the database 102 so as to locate all test cases affected by the modifications to the source code. For instance, the data analyzer 112a locates the test cases TC1–TC2 102a and 102b as being affected by the modification to the method M2. Once the affected test cases are located by the data analyzer 112a, a dependency test list 111a is created using all the test cases affected by the modification (e.g., TC1 And TC2).

At this point, the data optimizer 112b (i.e., the data analyzer/optimizer acting in the capacity of the optimizer) optimizes the dependency test list 111a. In one example, the data optimizer 112b creates a precision test list 111b of the dependent test cases, which satisfy a certain criteria. In one instance, the criteria can be selecting the test case which path is all inclusive of the path of another test case. For instance, in the embodiment which includes test cases TC1 And TC2 in the dependency test list 111a, the precision test list 111b created by the data optimizer 112b using the all inclusive path criteria will only include the test case TC2. In this manner, the data optimizer 112b of the present invention advantageously reduces the dependency test list and eliminates the redundant test case TC1.

Thereafter, the test cases in the precision test list 111b are used by the test executor 114' to test the product Java executable 104 so as to create an output 115 which in one embodiment is analyzed to determine whether the modification to the source code has had any negative effects.

Figure 3:
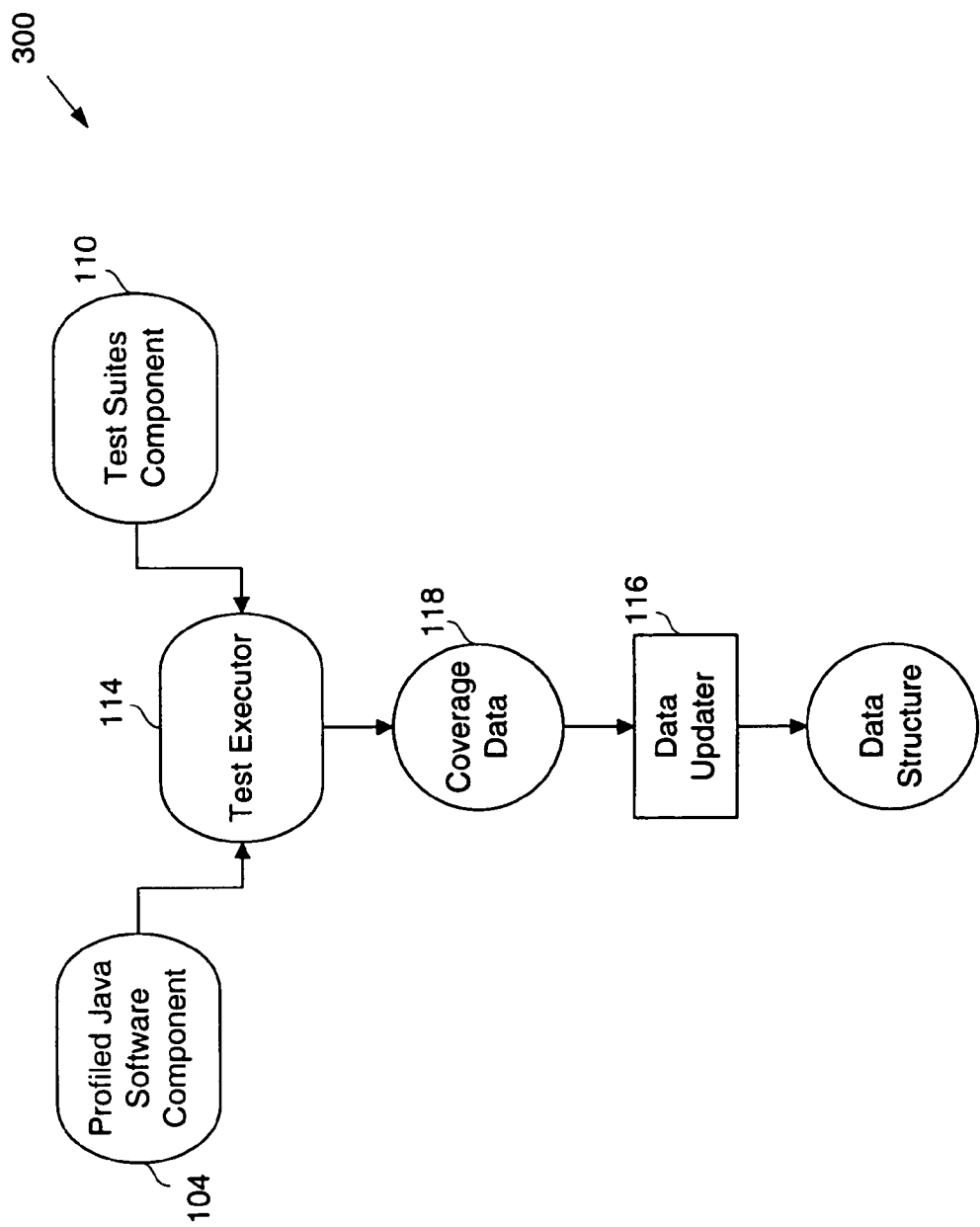
FIG. 3 is a simplified schematic diagram of an exemplary collection module of the intelligent test system, in accordance with another embodiment of the present invention.

Reference is made to FIG. 3 depicting an exemplary data collection module 300 of the present invention, in accordance with one embodiment of the present invention. The data collection system 300 includes the test suites component 110, the profiled Java software component 104, the data updater 116, and the database 102. In one example, the test executor 114 tests all the test cases in all of the test suites in the test suites component 110 using the profiled Java software component 104, creating the coverage data 118.

In one example, the profiled Java software 104 includes a plurality of special codes which when activated, causes certain information (e.g., flags, etc.) to be generated. By way of example, the profiled Java software 104 is a software code defined in the compiler of the computer system running the test suites. The profiled Java software 104 is written such that when the test executor 114 runs the test suites 110 using the profiled Java software, the compiler is designed to insert a plurality of documented and hidden flags into the source code. For instance, were the call tree profile format is used, the hidden flags included in the coverage data 118 can be used to traverse the paths of the methods and functions (i.e., can be traversed so as to determine the functions/methods called by a specific function/method in the source code).

In one embodiment, the coverage data component 118 determines the extent of the coverage of each method/function by each of the test cases. For instance, in one embodiment, it is determined how many lines of a specific method/function are tested by a given test case of a given component. In another example, the coverage data may be configured to be generated in the form of the call tree. Thus, the coverage data can be generated in any appropriate format (e.g., branch profile format, code coverage profile format, etc.) based on a type of profiling method used. The coverage data 118 is then saved into the data structure 116 using the interface data updater 116.

In one example, the coverage data is stored in the database 102 in a data structure in the form of the table. However, in another embodiment, the coverage data 118 may be stored into the database 102 in any appropriate data structure (e.g., linked lists, binary trees, key equal value pairs, etc.). Furthermore, the database 102 can be configured to be any appropriate database (e.g., relational database, SleepCat database, etc.). Additionally, the database engine can be any suitable database engine (e.g., Oracle 9i, SleepyCat, Open LDAP, etc.).

Figure 4:
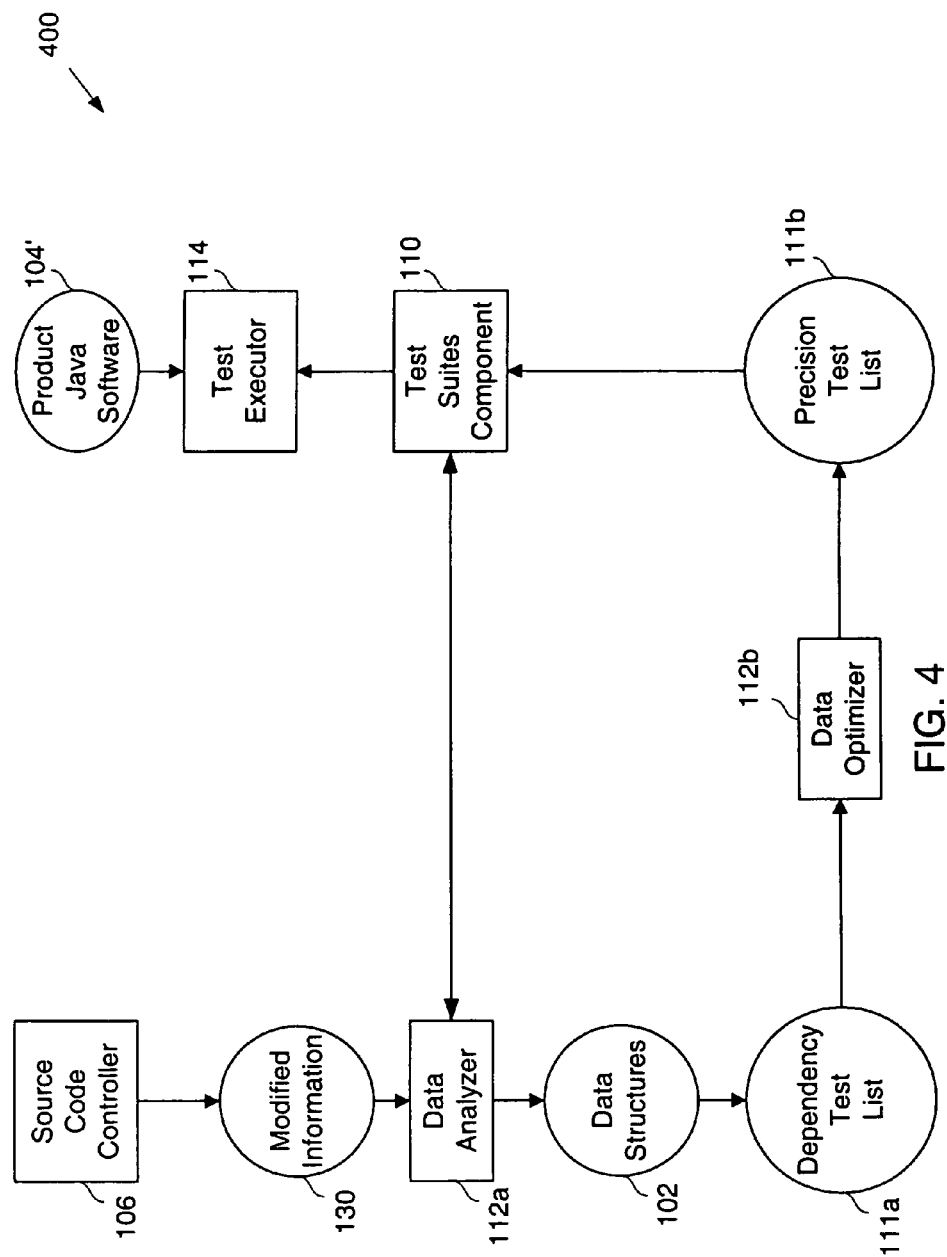
FIG. 4 is a block diagram illustrating an exemplary processing module of the intelligent test system, in accordance to yet another embodiment of the present invention.

FIG. 4 shows a data processing module 400 of the present invention, in accordance with one embodiment of the present invention. Summarily, the data analyzer 112a of this module is configured to receive a developer's notice as to a change to the source code. Upon receiving this notice, the data analyzer 112a queries the source code controller system 106 requesting the functions/methods that have been changed. The data analyzer then analyzes the changed functions/methods so as to locate the test cases affected by the modifications. Subsequently, a precision list of all the test cases satisfying a certain criteria is created from the dependency test list containing all the test cases affected by the modifications to the functions/methods.

In one example, the processing system 400 includes the source code controller system 106, the test executor 114, and the data analyzer/optimizer 112, in accordance with one embodiment of the present invention. The source code controller 106 generates a modified information 130, which in one example includes a list of all functions/methods modified. The modified information 130 is then sent to the data analyzer 112a, which in one example searches the database 102 so as to locate all test cases affected by the modifications. Then, the data analyzer 112a creates a dependency test list, which in one example includes a list of all test cases affected by the modifications. For instance, all test cases which path includes any of the modified functions/methods.

The dependency test list is then sent to the data optimizer 112b to be optimized. In one example, the data optimizer 112*b* places the test cases, which satisfy a certain criteria into the precision test list 111*b*. In one instance, the data optimizer 112*b* is configured to determine whether any of the test cases are all inclusive so as to eliminate redundant test cases. In one implementation, where the coverage format is implemented, the data optimizer 112*b* may be designed to select the test case having the maximum coverage of the modified function/method. In comparison, in the call tree format, the data optimizer 112*b* may be designed to select the test case which path encompasses the less inclusive path of a different test case. Accordingly, the data analyzer/optimizer 112 acts as a filter thus only selecting the test cases, which pass a certain criteria. By way of example, the data optimizer 112*b* can be configured to pick all test cases that include the maximum coverage of a given modified/added function/method, all test cases that include the minimum run time for a given modified/added function/method, or all test cases that perform a given modified/added function/method fastest. In a different embodiment, the data analyzer/optimizer 102 may be configured to implement any other suitable criteria.

Then, the precision test list 111*b* is used by the data analyzer 112*a* to obtain a copy of the test cases in the precision test list 111*b* from the test suites component 110. For instance, the database 102 may be configured to merely include the names of all test cases. That is, the source code for each test case is configured to be obtained from the test suites component 110.

Thereafter, the test executor 114 tests the product Java software 104' using the test cases in the precision test list thus substantially reducing the time associated with testing by eliminating the redundant test cases. In one example, the test executor 114 can be configured to dispatch the test execution request to a distributed test framework system (DTF) or to a user interface simple enough to use with DTF (DevConnect). In one implementation, the DTF is a Distributed Processing System as described in the U.S. patent application Ser. No. 09/953,223, filed Sep. 11, 2001, and entitled "DISTRIBUTED PROCESSING FRAMEWORK SYSTEM," having inventors Madhava V. Avvari, Satya N. Dodda, David S. Herron, Bae-Chul Kim, Gabriel R. Reynaga, Konstantin I. Boudnik, Narendra Patil. This U.S. Patent Application, which is assigned to Sun Microsystems Corporation, the assignee of the subject application, is incorporated herein by reference in its entirety.

Additionally, the embodiments of the present invention use the source code controller system 106 to automatically obtain the modifications to the Java source code. Thus, in this manner, the embodiments of the present invention significantly eliminate the manual intervention of humans associated with the prior art.

Figure 5A:
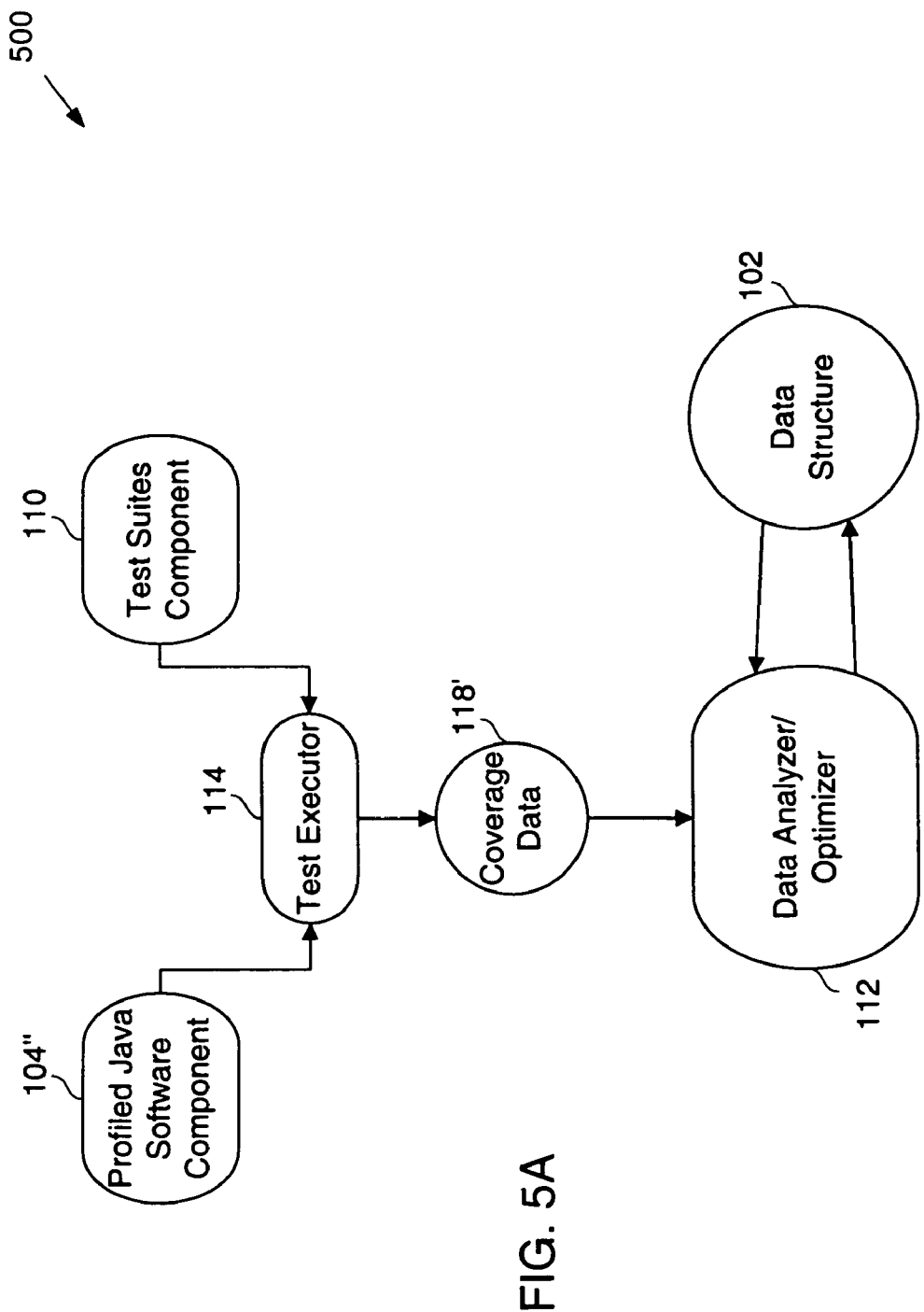
FIG. 5A depicts an exemplary maintenance module of the intelligent test system, in accordance with yet another embodiment of the present invention.
Figure 5B:
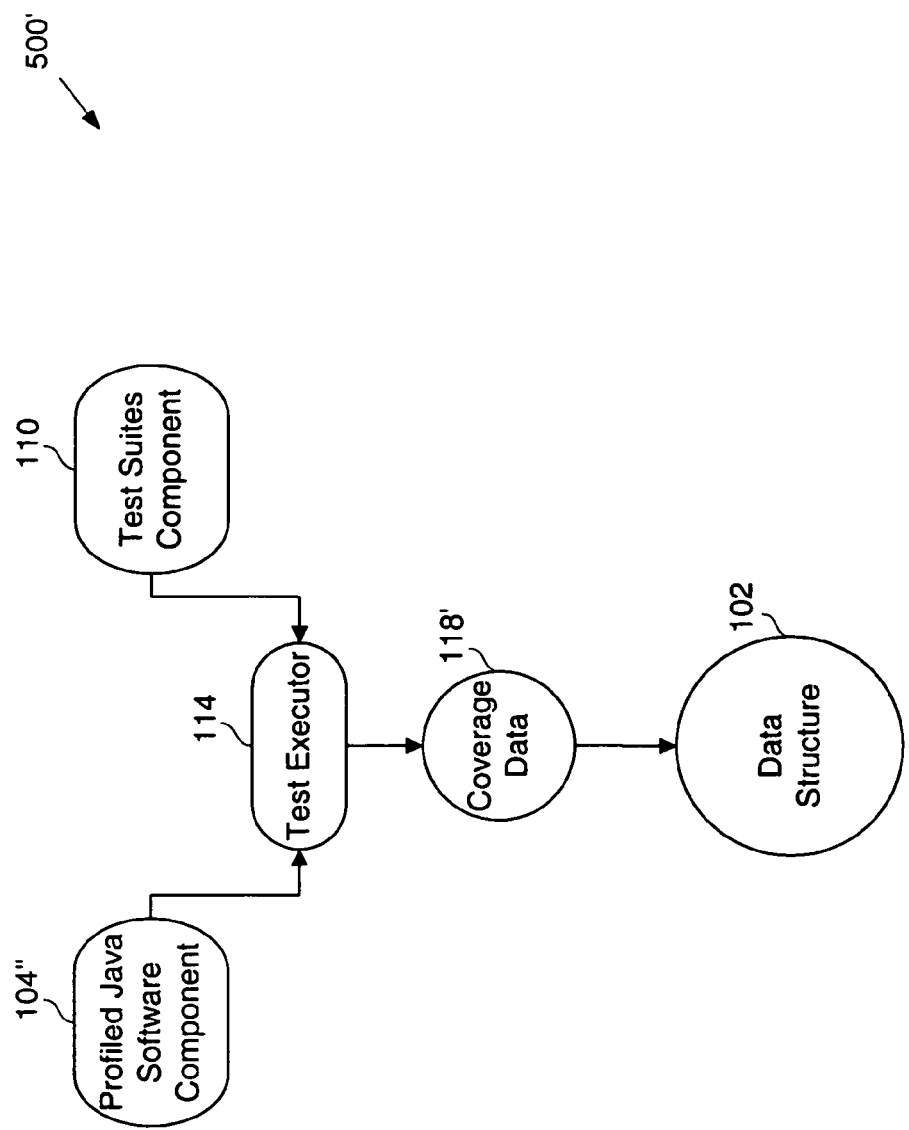
FIG. 5B depicts an exemplary maintenance module of the intelligent test system, in accordance to still another embodiment of the present invention.

FIGS. 5A and 5B depict exemplary maintenance modules 500, in accordance with one embodiment of the present invention. In one embodiment, the maintenance module 500 is configured to re-adjust, add, or delete the modified data or newly added data to the database 102, component-by-component, automatically, and at a previously determined interval. According to one embodiment, the maintenance module 500 includes the test suites component 110, the profiled Java software component 104, the test executor 114, the data analyzer/optimizer 112, and the database 102. In one example, the test executor 114 uses the test cases in the test suites component 110 to test the modified profiled Java software 104" so as to create modified coverage data 118'. This modified coverage data 118' is then used by the data analyzer/optimizer 112 so as to determine whether any differences exist between the coverage data 118 and the modified coverage data 118'. In one example, where the coverage data 118 and the modified coverage data 118' are not substantially identical, the data analyzer updates the database 102 thus replacing the modified portion of the coverage data 118 so as to reflect the modification. However, if the coverage data 118 and the modified coverage data 118' are identical, the data analyzer may take no further action at this point in time.

Comparatively, in the embodiment of FIG. 5B, the entire modified coverage data 118' replaces the entire coverage data existing in the database 102. Thus, in accordance to one embodiment, the maintenance module of the present invention merely updates the modified portion of the source code in the database 102 whereas in the embodiment of FIG. 5B, the maintenance module of the present invention is designed to update the data in the database by flushing out the existing coverage data 118 and replacing same with the entire modified coverage data. Thus, if merely a single method "C" is modified in the source code, the embodiment of FIG. 5A merely replaces that portion of the test case that include the method "C" while in the embodiment of FIG. 5A, the entire database is replaced by the modified coverage data.

Figure 6B:
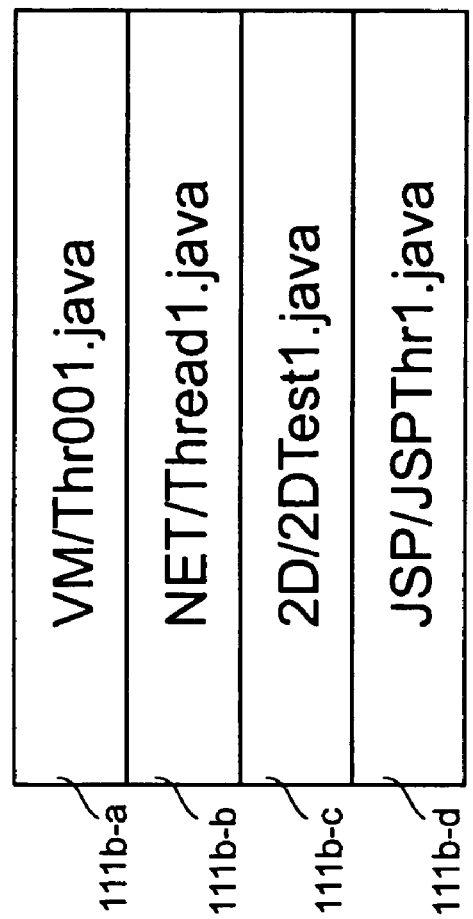
FIG. 6B is an illustration of a precision test list created using the table in FIG. 6A, in accordance to still another embodiment of the present invention.

FIG. 6A depicts a format of a portion of an exemplary data structure in the form of a table 102', in accordance with one embodiment of the present invention. As shown, the table 102' includes the coverage data 118. A plurality of Interrupt( ) method 108, each having a thread class name 122, has been used in five different test cases 124*a*–124*e* Thread1.java, Thr001.java, 2Dtest1.java, JSPTh1.java, Thr002.java, and Thr001.javais, respectively. As shown, the test cases 124*a*–124*a* Thread1.java, Thr001.java, 2Dtest1.java, JSPTh1.java, Thr002.java, and Thr001.javais are respectively defined in components 126*a*–124*e* NET, VM, 2D, JSP, VM, and VM. As also illustrated, the Interrupt( ) method 108 in each test case 124*a*–124*a* has a different coverage component 128*a*–128*e* 80%, 95%, 75%, 82%, 15%, and 80%.

In one example, the coverage components 128*a*–128*e* are defined as the test coverage of the Interrupt( ) method 108. That is, in one instance, the test case 124*a* Thr001.java in the component 126*b* VM tests over ninety-five (95) percent of the source code for the Interrup( ) method 108 while the test case 124*a* Thr002.java of the component 124*e* merely covers fifteen (15) percent of the source code for the Interrupt( ) method 108*e*.

Thus, when there is a modification to the interrupt( ) method 108, the embodiments of the present invention locate the test cases 124*a*–124*a* and their respective components 126*a*–126*e* affected by the modification. In this manner, the test cases depending on the Interrupt( ) method 108 are located. Thereafter, the percentage of coverage for the Interrupt( ) method 108 in each of the test cases is determined. In one example, where the Interrupt( ) method has been used in more than one test case in a single component (e.g., test cases 124*b* and 124*a* of components VM 126*b* and 126*e*) the data analyzer/optimizer of the present invention is configured to select the test case having the maximum test coverage of the Interrupt( ) method 108. In this manner, the embodiments of the present invention beneficially eliminate the necessity to run the test case 124*e*, which merely covers fifteen (15) percent of the source code for the interrupt method. The same analysis equally applies to the remaining Interrupt( ) method 108.

The precision test list 111*b* resulting from the optimization characteristic of the data analyzer/optimizer 112 of the present invention is depicted in FIG. 5B, in accordance with one embodiment. As shown, the precision test list 111*b* includes the components and the test cases 111*b-a* through 111*b*–*d* of the test cases that will be tested by the test executor. As shown, between the two test cases 124*b* and 124*e*, only the test case 124*a* Thr001.java is tested in the VM component.

Figure 7A:
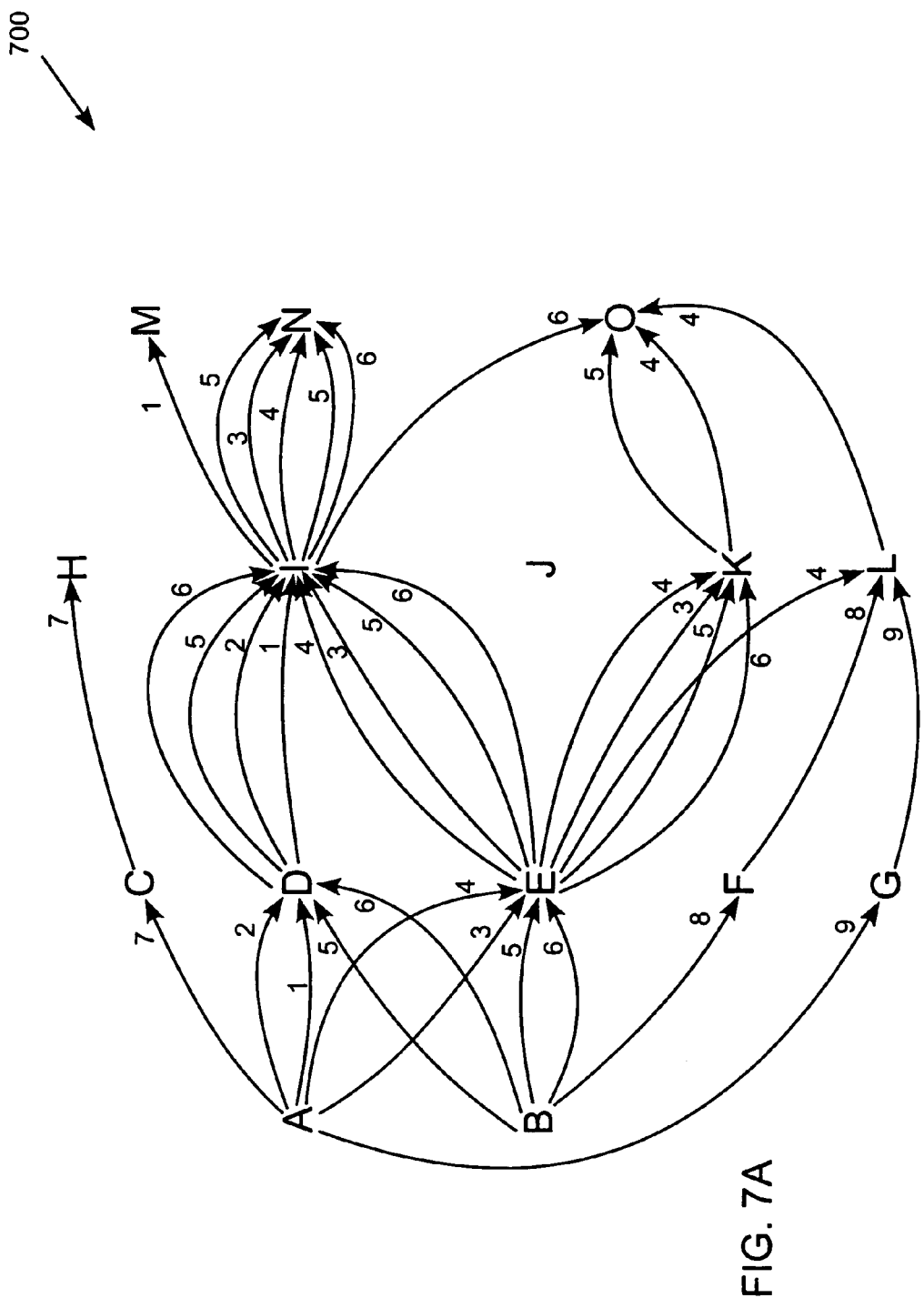
FIG. 7A depicts a call tree showing the dependencies existing between a plurality of elements, in accordance to yet another embodiment of the present invention.

Implementing the call tree profiling format to eliminate redundancy of test cases defined in different components of a test suite and creating the precision test list is shown in FIGS. 7A–7C, in accordance with one embodiment of the present invention. As shown in FIG. 7A, a call tree 700 depicts the dependencies existing between a plurality of elements (e.g., methods, functions, etc.) A–N. For instance referring to the first test case 702, the element M is shown to be dependent on element I, which in turn is dependent on element D. Element D is shown to be dependent on element A. In contrast, the second test case shows that the element I is dependent on element D that is in turn dependent on element A. In such scenario, where there is a change to the source code in element D, in accordance with one embodiment of the present invention the first test case is selected since its path is inclusive of the path for the second test case 704. Thus, the first test case 702 has been included in the precision test list 600" shown in FIG. 6C, in accordance with one embodiment of the present invention.

The third test case 706 includes five elements with element K being dependent on element E that in turn is dependent on element A. Element N is shown to be dependent on element I which in turn is dependent on element E that is dependent on element A. Comparatively, the fourth test case 708 is shown to involve 7 elements. Element O is shown to be dependent on element L which in turn is dependent on Element E which itself is dependent on element A. Also shown is that element O is also dependent on element K which in turn is dependent on element E that is dependent on element A. Element N is illustrated to be dependent on element I which in turn is dependent on element E that is dependent on element A. Again, where there is a change to the source code in element E, in accordance with one embodiment of the present invention the fourth test case 708 is selected since its path encompasses the path for the third test case 706. As a result, the third test case 606 is not included in the precision test list 700" shown in FIG. 6C.

In a like manner, the fifth test case is shown to include 7 elements. As shown, element on is shown to be dependent on element K which in turn is dependent on element E that is dependent on b. Element N is shown to be dependent on element I that is dependent on element E which in turn is dependent on element B. Element O is further shown to be dependent on element I that is dependent on element E which in turn is dependent on element B. Element N is further shown to be dependent on element I that is dependent on element D which in turn is dependent on element B.

In comparison, the seventh 712 also includes 7 elements. As shown, element K is shown to be dependent on element E that is dependent on element B. Element O is shown to be dependent on element I that is dependent on element E which in turn is dependent on element B. Element N is dependent on element I that is dependent on element E which in turn is dependent on element B. Element I is shown to be dependent on element D that is dependent on element B. As shown, once again, where there is a change to the source code in element N, in accordance with one embodiment of the present invention the fifth test case 710 is selected since its path encompasses the path for the sixth test case 712. Thus, the precision test list 700" is shown to only include the fifth test case 710.

Figure 8:
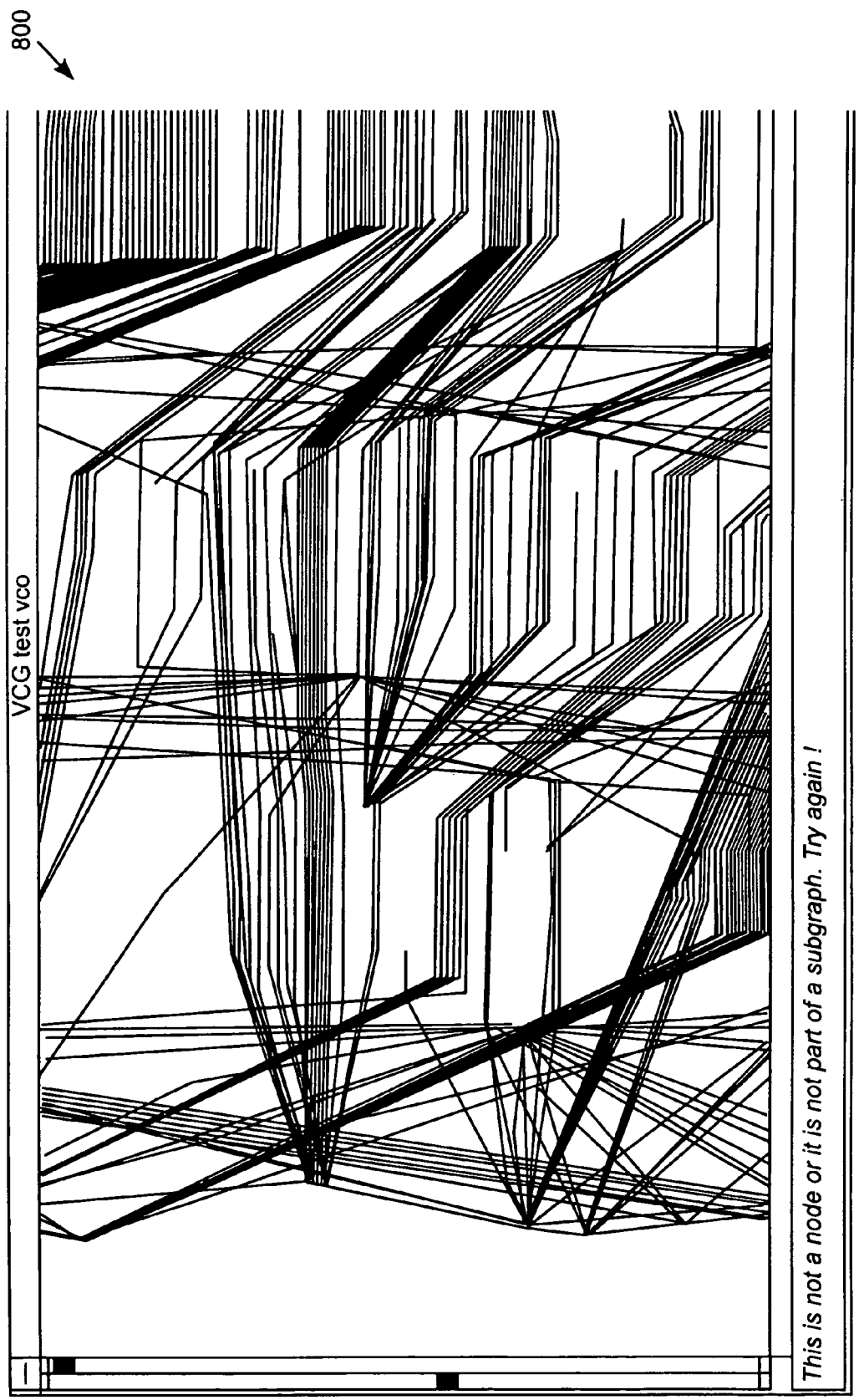
FIG. 8 is the snapshot of an exemplary call tree, in accordance to still another embodiment of the present invention.

FIG. 8 depicts a snap shot of an exemplary call tree 800, in accordance with one embodiment of the present invention. As shown, tracking the dependencies of a plurality of elements creates a complex call tree.

Figure 9:
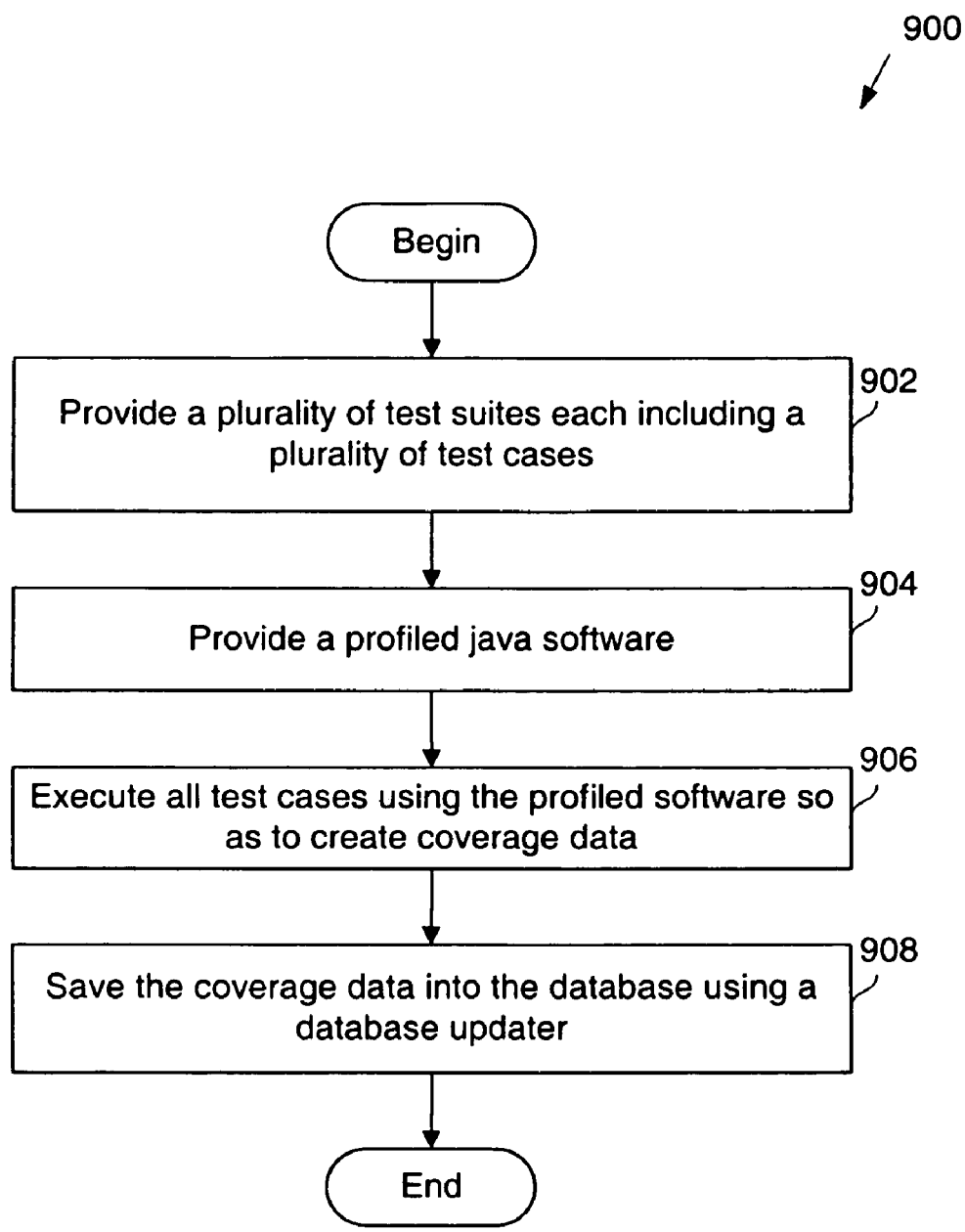
FIG. 9 is a flow chart diagram illustrating a method operations implemented by an exemplary data collection system, in accordance with yet another embodiment of the present invention.

FIG. 9 depicts a flowchart 900 illustrating the method operations performed by an exemplary collection module, in accordance with one embodiment of the present invention. The method begins in operation 902 in which a plurality of test suites each including a plurality of test cases are provided followed by operation 904 in which a profiled Java software is provided. Next, in operation 906, all test cases are executed using the profiled Java software thus creating the coverage data. Then, in operation 908 the coverage data is saved into a database using a database updater.

Figure 10:
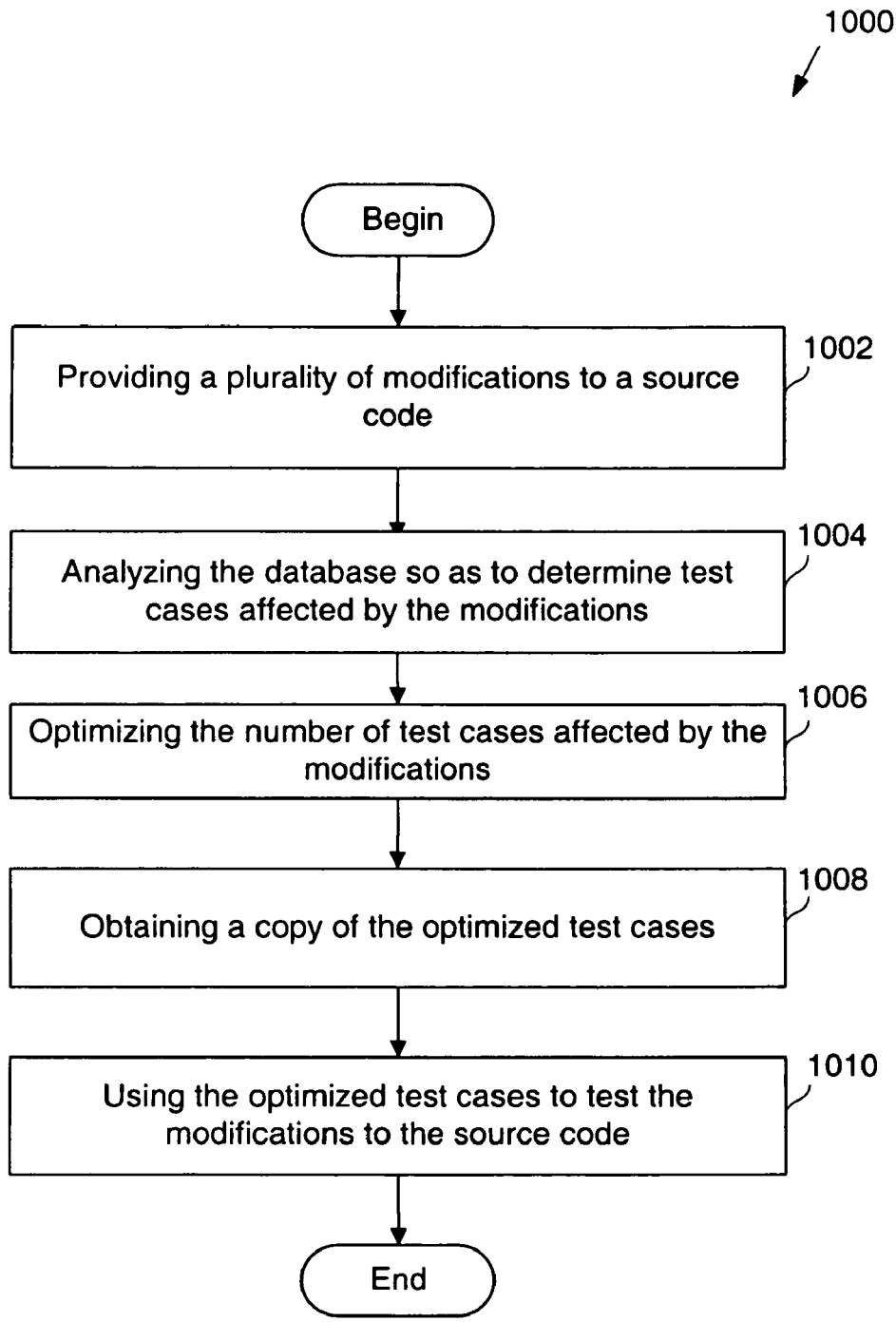
FIG. 10 is a flow chart diagram illustrating a method operations implemented by an exemplary data processing module, in accordance with yet another embodiment of the present invention.

FIG. 10 depicts a flowchart 1000 illustrating the method operations performed by an exemplary performance module, in accordance with one embodiment of the present invention. The method starts in operation 1002 in which a plurality of modifications to the source code are provided. In one example, the modifications are automatically sent to the data analyzer/optimizer. Next, in operation 1004, the database is analyzed so as to determine the test cases affected by the modifications to the source code. Proceeding to operation 1006, the test cases affected by the modifications are optimized followed by operation 1008 in which copies of the optimized test cases are obtained. In one example, the analyzer obtains the copy of the optimized test cases. Then, in operation 1010, the optimized test cases are used to test the modifications to the source code.

Figure 11A:
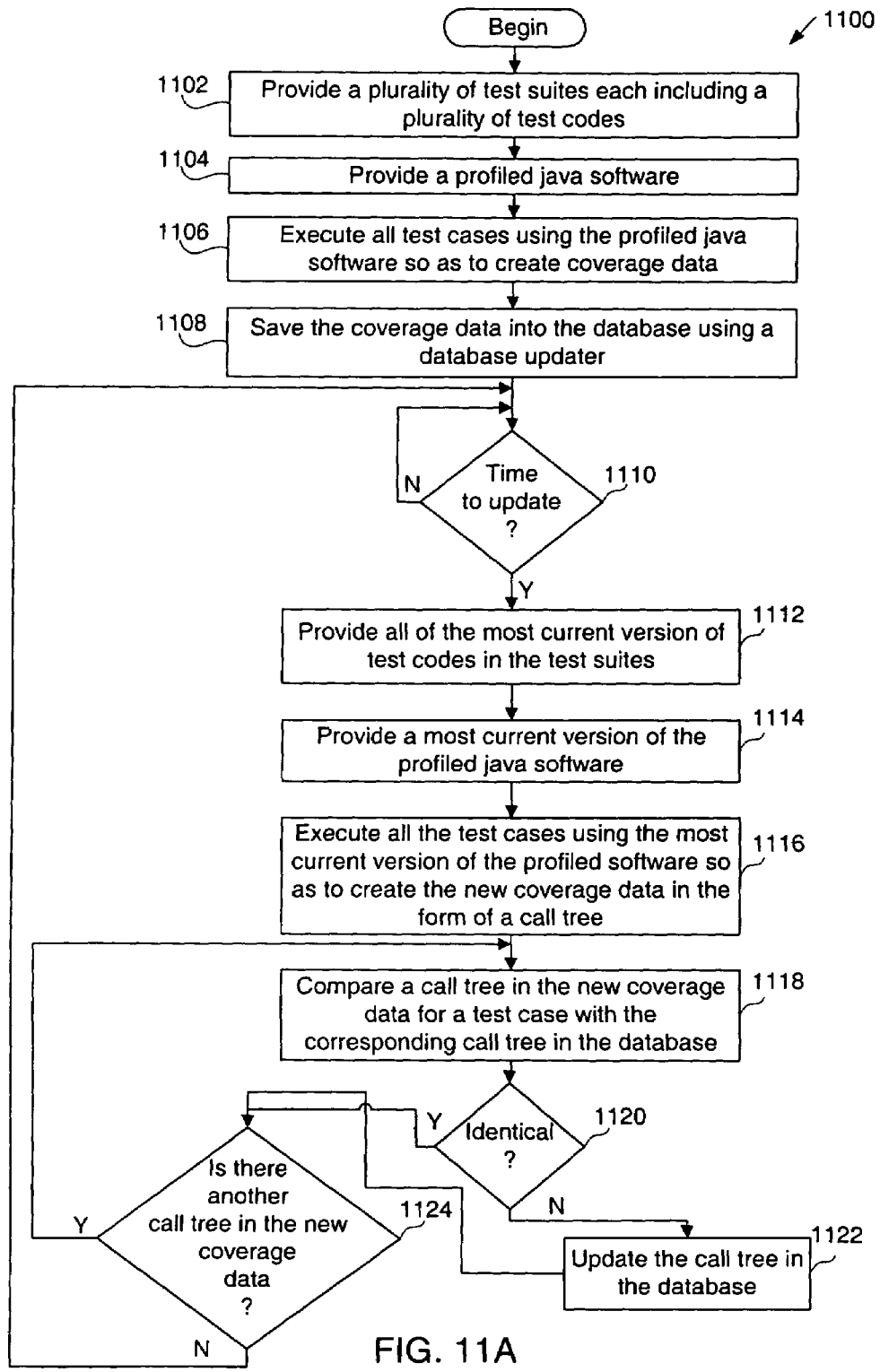
FIG. 11A is a flow chart diagram illustrating a method operations implemented by an exemplary maintenance module, in accordance with yet another embodiment of the present invention.
Figure 11B:
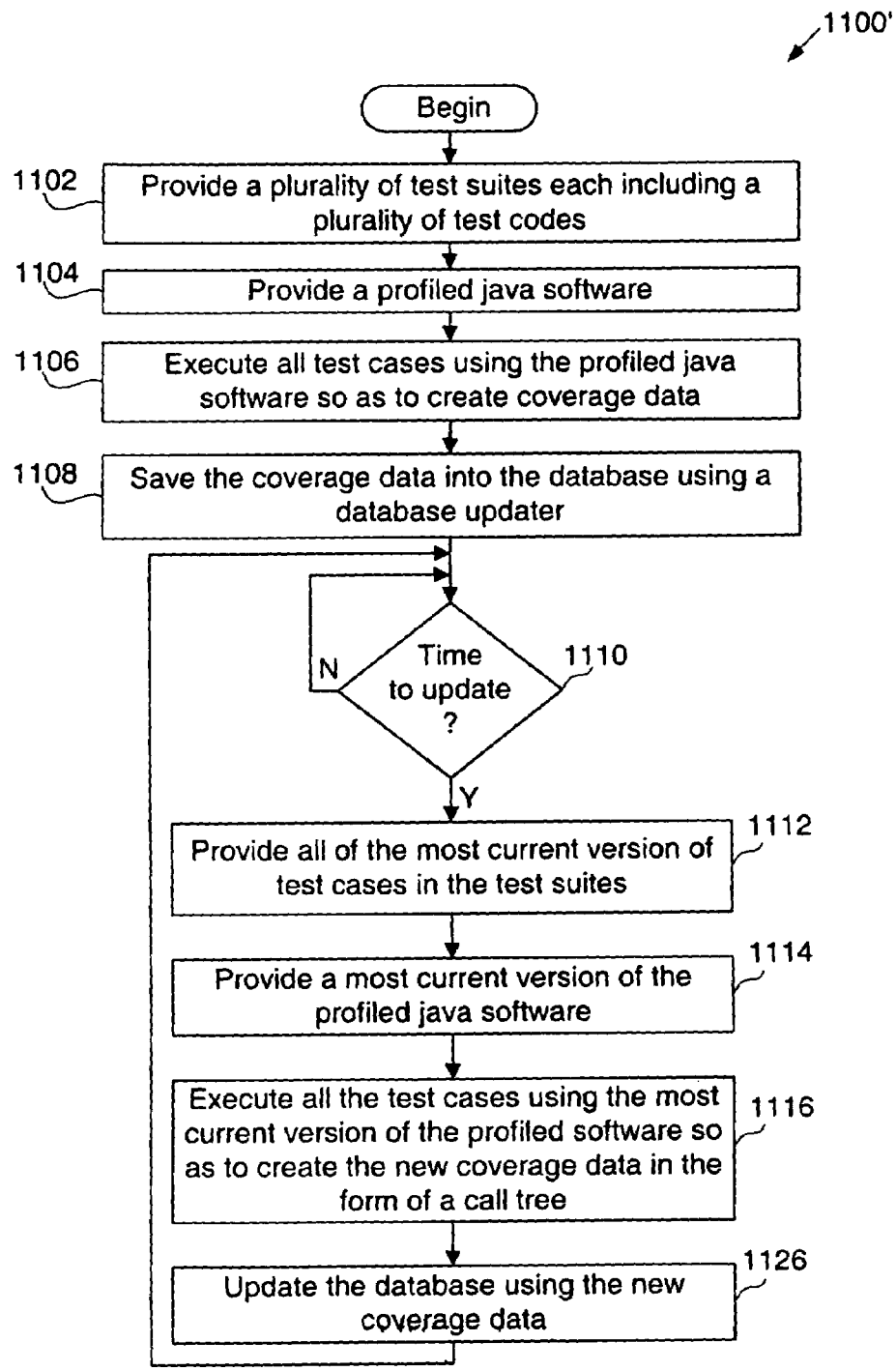
FIG. 11B is a flow chart diagram illustrating a method operations implemented by an exemplary maintenance module, in accordance with yet another embodiment of the present invention.

FIG. 11 depicts a flowchart 1100 illustrating the method operations performed by an exemplary maintenance module, in accordance with one embodiment of the present invention. The method starts in operation 1102 in which a plurality of test suites each including a plurality of test cases are provided. Then, in operation 1104 a profiled Java software is provided followed by operation 1106 in which all the test cases in the test suites are executed using the profiled Java software creating the coverage data. Next, in operation 1108 the coverage data is saved into a database using a database updater.

Proceeding to operation 1110, a determination is made as to whether it is time to update the database. If the pre-scheduled interval to update the database has not been reached, the method awaits reaching that time. If it is time to update the database, the most current version of the test cases in the test suites are provided in operation 112 followed by providing the most current version of the profiled Java software in operation 1114.

Then, in operation 1116, all the test cases in the test suites are executed using the most current version of the profiled Java software so as to create the new version of the coverage data. The new coverage data is in the format of a call tree. Next, in operation 1118 the new call tree for a test case is compared with the corresponding existing call tree in the database.

Proceeding to operation 1120, a determination is made as to whether the new call tree is identical to the corresponding existing call tree. If the new call tree is not identical to the corresponding existing call tree, in operation 1122, the existing call tree in the database is updated. In one example, it may be configured to merely update that portion of the call tree that has been modified rather than the entire call tree.

However, if it is determined that the new call tree is identical to the corresponding existing call tree, the method continues to operation 1124 in which a determination is made as to whether there are any other call trees in the new coverage data. If there is another call tree in the new coverage data, the method continues to operation 1118 in which the method compares the call tree in the new coverage data with the corresponding existing call tree. Otherwise, the method continues to operation 1110 in which the method awaits the arrival of the next pre-set interval.

FIG. 11 depicts a flowchart 1100' illustrating another method operations performed by an exemplary maintenance module, in accordance with one embodiment of the present invention. The method starts in operation 1102 in which a plurality of test suites each including a plurality of test cases are provided. Then, in operation 1104 a profiled Java software is provided followed by operation 1106 in which all the test cases in the test suites are executed using the profiled Java software creating the coverage data. Next, in operation 1108 the coverage data is saved into a database using a database updater.

Proceeding to operation 1110, a determination is made as to whether it is time to update the database. If the pre-set interval to update the database has not been reached, the method awaits reaching that interval. If it is time to update the database, the most current version of the test cases in the test suites are provided in operation 112 followed by providing the most current version of the profiled Java software in operation 1114.

Then, in operation 1116, all the test cases in the test suites are executed using the most current version of the profiled Java software so as to create the new version of the coverage data. The new coverage data maybe in the format of a call tree. Then, in operation 1126 the database is updated using the new coverage data. That is, the new coverage data replaces the coverage data existing in the database. Thereafter, the method continues to operation 1110 where the method awaits the arrival of the next pre-set time interval.

The advantages of the present invention are numerous. Most importantly, the embodiments of the present invention capture and examine the modifications to the source code automatically thus substantially eliminating the necessity for manual intervention. Another advantage of the present invention is that the embodiments of the present invention create a dynamic test list thus substantially reducing the test cycles. Yet another advantage of the present invention is that the testing operation is optimized. Still another advantage of the present invention is that in contrast to the prior art, the embodiments of the present invention perform precise testing thus eliminating the redundancy associated with the prior art. Still another advantage of the present invention is that the intelligent test system of the present invention is backward compatible. Yet another advantage of the present invention is that the embodiments of the present invention have improved the interoperability analysis on other areas (e.g., determining the extent of coverage of a certain portion of the source code in one component (e.g., an advanced windowing toolkit (AWT), etc.) by a different component (e.g., virtual machine, etc.), etc.).

With the above embodiments in mind, it should be understood that, the invention may be practiced with other computer system configurations including hand-held devices, microprocessor systems, microprocessor-based or programmable consumer electronics, minicomputers, mainframe computers and the like. Furthermore, the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Furthermore, although the present invention implements Java programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An intelligent test system for testing software code, comprising:
   a profiled software component, wherein the profiled software component is a profiled Java™ software component;
   a test executor configured to use the profiled software component to execute a plurality of test cases of a test suite to create coverage data;
   a database configured to store the coverage data;
   a database updater configured to store the coverage data into the database; and
   a data analyzer/optimizer configured to analyze the coverage data contained in the database to find test cases affected by a modification to the software code, the data analyzer/optimizer further configured to optimize the test cases affected by the modification to the software code by selecting fewer of the test cases affected by the modification to the software code based on a criteria, the data analyzer/optimizer further configured to create a precision test list of the selected fewer test cases,
   wherein the test executor uses the selected fewer test cases of the precision test list to test the modification to the software code.

2. An intelligent test system for testing software code as recited in claim 1, wherein a source code controller system is configured to automatically provide the data analyzer/optimizer with the modification to the software code.

3. An intelligent test system for testing software code as recited in claim 1, wherein the criteria is to select the affected test case which tests a most number of lines of a modified portion of the software code.

4. A data collection module of a test system, the data collection module comprising:
- a test suites component having a test suite including a plurality of test cases;
- a profiled software component, wherein the profiled software component is a profiled Java™ software component;
- a test executor being configured to use the profiled software component to process the test cases in the test suite to create coverage data;
- a database configured to store the coverage data; and
- a database updater configured to store the coverage data into the database,
- wherein the coverage data stored in the database is used to determine test cases affected by a modification to a software code, the coverage data further being used to create a precision test list of the test cases affected by the modification to the software code wherein redundant affected test cases are eliminated.

5. A data collection module of a test system as recited in claim 4, wherein the coverage data reveals an extent of coverage of a modified portion of a software code by each test case.

6. A data collection module of a test system as recited in claim 4, wherein a data structure of the database is a table.

7. A data processing module for use in a test system, the data processing module comprising:
- a database component storing coverage data;
- a source code controller system configured to provide modified information, the modified information defining a modification to source code, wherein the source code is a Java™ source code;
- a data analyzer/optimizer configured to analyze the coverage data using the modified information to find test cases affected by the modified information, the data analyzer/optimizer further configured to create a precision test list that includes selected test cases of affected test cases, the selected tests cases satisfying a criteria; and
- a test executor configured to use the test cases satisfying the criteria to test the modification to the source code.

8. A data processing module for use in a test system as recited in claim 7, wherein the criteria is selecting the affected test case which tests a most number of lines of a modified portion of the source code.

9. A data processing system for use in a test system as recited in claim 7, wherein the coverage data is in a call tree format.

10. A data processing system for use in a test system as recited in claim 9, wherein the criteria is selecting the affected test case which path is most encompassing.

11. A method for testing computer software under development, the method comprising:
- using instrumented code to execute test cases in a test suite to create coverage data, wherein the instrumented code is a profiled Java™ software component;
- storing the coverage data in a database;
- obtaining modification information to the source code of the computer software under development;
- analyzing the coverage data in the database to find test cases affected by a particular modification to the source code;
- creating a dependency test list of all test cases affected by the particular modification to the source code;
- optimizing affected test cases in the dependency test list by selecting the affected test cases satisfying a criteria;
- generating a precision test list of the affected test cases that satisfy the criteria; and
- executing the source code using the affected test cases of the precision test list.

12. A method for testing computer software under development, as recited in claim 11, wherein the data analyzer/optimizer is configured to reduce the number of the affected test cases in the dependency test list.

13. A method for testing computer software under development as recited in claim 11, wherein the criteria is selecting the affected test case that tests a most number of lines of a modified portion of the source code.

14. A method for testing computer software under development as recited in claim 11, wherein the coverage data has a format of a call tree.

15. A method for testing computer software under development, as recited in claim 14, wherein the criteria is selecting the affected test case whose call tree has a path that is most encompassing.

16. A method for testing computer software under development, as recited in claim 11, wherein the data structure of the database is a table.

* * * * *